(12) United States Patent
Shalon (10) Patent No.: US 9,069,189 B2
(45) Date of Patent: Jun. 30, 2015

(54) EYEWEAR DEVICE AND SYSTEM

(71) Applicant: Thinoptics Inc., Palo Alto, CA (US)

(72) Inventor: Tadmor Shalon, Palo Alto, CA (US)

(73) Assignee: THINOPTICS, INC., Palo Alto, CA (US)

( * ) Notice: Subject to any disclaimer, the term of this patent is extended or adjusted under 35 U.S.C. 154(b) by 0 days.

(21) Appl. No.: 13/899,606

(22) Filed: May 22, 2013

(65) Prior Publication Data

US 2013/0258269 A1    Oct. 3, 2013

Related U.S. Application Data

(63) Continuation of application No. PCT/IB2011/055208, filed on Nov. 21, 2011.

(60) Provisional application No. 61/344,930, filed on Nov. 22, 2010.

(51) Int. Cl.
| | |
|---|---|
| *G02C 5/00* | (2006.01) |
| *G02C 5/12* | (2006.01) |
| *G02C 5/22* | (2006.01) |
| *G02C 5/02* | (2006.01) |
| *A45C 11/04* | (2006.01) |
| *G02B 27/01* | (2006.01) |

(52) U.S. Cl.
CPC ............... *G02C 5/128* (2013.01); *G02C 5/008* (2013.01); *G02C 5/2263* (2013.01); *G02C 5/02* (2013.01); *G02B 2027/0178* (2013.01); *A45C 11/04* (2013.01); *G02C 5/122* (2013.01)

(58) Field of Classification Search
CPC .......... G02C 5/12; G02C 5/126; G02C 5/128; G02C 5/08; G02C 5/02; G02C 5/2263; G02C 5/008; G02B 2027/0178; G02B 6/3859; A45C 11/04; A45C 11/00
USPC ........ 351/124–139, 70–81, 64–65, 69–70, 79
See application file for complete search history.

(56) References Cited

U.S. PATENT DOCUMENTS

| | | |
|---|---|---|
| 261,799 A | 7/1882 | Woodward |
| 380,491 A | 4/1888 | Kahn |

(Continued)

FOREIGN PATENT DOCUMENTS

| | | |
|---|---|---|
| DE | 4407313 A1 | 9/1995 |
| EP | 2016457 B1 | 6/2011 |

(Continued)

OTHER PUBLICATIONS

International Preliminary Report on Patentability Dated May 30, 2013 From the International Bureau of WIPO Re. Application No. PCT/IB2011/055208.

(Continued)

*Primary Examiner* — Ricky Mack
*Assistant Examiner* — Daniele Manikeu
(74) *Attorney, Agent, or Firm* — Shay Glenn LLP (57) ABSTRACT

An eyewear is provided. The eyewear includes lenses interconnected via a lens bridge and a nose clamp connected to the lens bridge or lenses. The nose clamp includes nose pads which are mountable onto a nose of a user, wherein the nose pads are configured for accommodating noses of varying width without substantially affecting a distance between the lenses or their orientation on the face of the user.

18 Claims, 11 Drawing Sheets

(56) References Cited

U.S. PATENT DOCUMENTS

| | | | |
|---|---|---|---|
| 470,029 A | 3/1892 | Wood | |
| 529,988 A | 11/1894 | Wood | |
| 585,619 A | 6/1897 | Cottet, Jr. | |
| 677,996 A | 7/1901 | Kleinert | |
| 1,017,579 A | 2/1912 | Nicol | |
| 1,919,938 A | 7/1933 | Fielding | |
| 1,931,634 A | 10/1933 | Tanasso et al. | |
| 2,004,445 A | 6/1935 | Meyer | |
| 2,023,469 A | 12/1935 | Grier | |
| 2,036,591 A | 4/1936 | Marciano | |
| 2,047,646 A | 7/1936 | Nerney | |
| 2,061,411 A | 11/1936 | Tanasso et al. | |
| 2,234,729 A | 3/1941 | Montalvo-Guenard | |
| 2,478,921 A | 8/1949 | Hansen | |
| D209,016 S | 10/1967 | Weissman | |
| D220,597 S | 4/1971 | Dawson et al. | |
| D247,111 S | 1/1978 | Olivan | |
| D289,122 S | 4/1987 | Meyer et al. | |
| 4,840,476 A | 6/1989 | Rooney | |
| D305,478 S | 1/1990 | Lahm et al. | |
| 4,896,955 A * | 1/1990 | Zider et al. | 351/41 |
| 4,924,245 A * | 5/1990 | Dianitsch | 351/136 |
| 5,015,087 A | 5/1991 | Baratelli | |
| D318,949 S | 8/1991 | Mawhinney et al. | |
| D322,262 S | 12/1991 | Manus | |
| D330,456 S | 10/1992 | Lehman | |
| D343,402 S | 1/1994 | Scoppettone | |
| 5,369,451 A * | 11/1994 | Tamagawa | 351/136 |
| 5,431,506 A * | 7/1995 | Masunaga | 403/271 |
| D363,603 S | 10/1995 | Leveen et al. | |
| D371,679 S | 7/1996 | Nejman | |
| D379,558 S | 6/1997 | Mischenko et al. | |
| 5,646,707 A | 7/1997 | Arnette | |
| 5,748,280 A | 5/1998 | Herman | |
| D407,591 S | 4/1999 | Bolognia et al. | |
| D418,857 S | 1/2000 | Paulsen et al. | |
| 6,017,119 A | 1/2000 | Huang | |
| D421,526 S | 3/2000 | Isaacson | |
| 6,077,368 A * | 6/2000 | Nakamura et al. | 148/563 |
| D435,340 S | 12/2000 | Kojoori | |
| 6,158,860 A | 12/2000 | Huang | |
| D436,613 S | 1/2001 | Chao | |
| D438,904 S | 3/2001 | Reynolds | |
| 6,264,326 B1 | 7/2001 | Hyoi | |
| D446,237 S | 8/2001 | Koevari | |
| D451,119 S | 11/2001 | Koevari | |
| 6,371,614 B1 | 4/2002 | Herman | |
| 6,773,106 B2 | 8/2004 | Herman | |
| 6,814,226 B2 | 11/2004 | Chao | |
| D503,087 S | 3/2005 | Dzwill et al. | |
| D507,871 S | 8/2005 | DiMarchi et al. | |
| D515,805 S | 2/2006 | Jones | |
| D518,636 S | 4/2006 | Sievers | |
| D527,891 S | 9/2006 | Hoeksema | |
| 7,117,990 B2 | 10/2006 | Sarif | |
| 7,452,070 B2 | 11/2008 | Oskarsson | |
| D585,471 S | 1/2009 | Thompson | |
| 7,484,843 B1 | 2/2009 | Lin | |
| 7,748,843 B2 * | 7/2010 | Stewart | 351/158 |
| D631,246 S | 1/2011 | Boettner | |
| D651,799 S | 1/2012 | Dial | |
| D653,656 S | 2/2012 | Charnas et al. | |
| D669,082 S | 10/2012 | Sato | |
| D703,198 S | 4/2014 | Simmer | |
| 2001/0028431 A1 * | 10/2001 | Rossin | 351/83 |
| 2001/0055093 A1 | 12/2001 | Saitoh et al. | |
| 2003/0025871 A1 * | 2/2003 | Masunaga | 351/110 |
| 2009/0051868 A1 | 2/2009 | Kwan | |
| 2009/0310080 A1 * | 12/2009 | Dellapina | 351/111 |
| 2012/0140163 A1 | 6/2012 | Hogan | |
| 2012/0218506 A1 | 8/2012 | Perez | |
| 2014/0360898 A1 | 12/2014 | Kantor et al. | |

FOREIGN PATENT DOCUMENTS

| | | |
|---|---|---|
| WO | WO2010/086650 A1 | 8/2010 |
| WO | WO 2012/069980 | 5/2012 |

OTHER PUBLICATIONS

International Search Report and the Written Opinion Dated Jun. 14, 2012 From the International Searching Authority Re. Application No. PCT/IB2011/055208.

Invitation to Pay Additional Fees Dated Mar. 23, 2012 From the International Searching Authority Re. Application No. PCT/IB2011/055208.

PINCE-NEZ; www.en.wikipedia.org/wiki/Pince-nez; pp. 1-4; printed Sep. 20, 2013.

Shalon, Tadmor; U.S. Appl. No. 14/284,879 entitled "Universal Eyewear," filed May 22, 2014.

Shalon, Tadmor; Design U.S. Appl. No. 29/474,045 entitled "Eyewear Case," filed May 23, 2013.

Shalon, Tadmor; Design U.S. Appl. No. 29/474,044 entitled "Pince Nez Eyewear," filed May 23, 2013.

* cited by examiner

EYEWEAR DEVICE AND SYSTEM

RELATED APPLICATIONS

This application is a Continuation of PCT Patent Application No. PCT/IB2011/055208 having International filing date of Nov. 21, 2011, which claims the benefit of priority under 35 USC 119(e) of U.S. Provisional Patent Application No. 61/344,930 filed Nov. 22, 2010. The contents of the above applications are all incorporated by reference as if fully set forth herein in their entirety.

FIELD AND BACKGROUND OF THE INVENTION

The present invention relates to eyewear and in particular to a pair of Pince-Nez eyeglasses that are thin, light and easily storable. The present invention further relates to a system which includes the eyewear and a storage case which enables fast and easy retrieval of the eyewear as well as an eyewear system that enables user customization of the eyewear nose pads.

According to the Vision Council of America, approximately 75% of adults use some sort of vision correction. Approximately 30% of the American population is near-sighted, while about 60% of Americans are far-sighted. As people age, they are more likely to need vision correction for far-sightedness.

There is a huge variety of eyewear styles, shapes, and colors on the market including eyewear which can be folded into a small size or are small enough to be easily carried and used (Eschenbach Reading glasses, I4U Pince-Nez, Wallet ReadersRx). Compact designs are especially useful in eyewear that are used episodically for specific tasks. While eyewear used for correction of near-sightedness are typically worn most of the day; sunglasses and eyewear used for correcting far-sightedness are worn as needed and thus are typically carried around in a bag or pocket.

Thus it would be useful to have eyewear with optical correction and/or protection in a form factor that can be conveniently carried on the person while being aesthetically pleasing and comfortable to wear.

SUMMARY OF THE INVENTION

According to one aspect of the present invention there is provided an eyewear system comprising: (a) eyewear comprising lenses interconnected via a lens bridge; and (b) at least 2 sets of nose pads attachable to the eyewear (preferably via clips), each set of the at least two sets having a specific thickness and or compliance for accommodating noses of varying widths without substantially affecting an orientation of the lenses with respect to the face or the pressure on the user's nose.

According to further features in preferred embodiments of the invention described below, the nose pad include a texturized skin contact layer for enhancing friction between the nose pads and the nose.

According to still further features in the described preferred embodiments the nose pad include an elastic layer for enhancing conformation to the user's nose shape.

According to another aspect of the present invention there is provided a case for eyewear comprising: (a) a storage compartment configured for storing the eyewear in a folded configuration; and (b) a release mechanism for releasing the eyewear from the storage compartment wherein the releasing results in self-unfolding of the eyewear.

According to still further features in the described preferred embodiments an internal storage volume of the case is less than 10 cm$^3$ for a full 40 mm wide optical zone 2.5 diopter readers.

According to still further features in the described preferred embodiments the eyewear is a foldable Pince Nez eyewear.

According to still further features in the described preferred embodiments the case further comprises a mechanism for attaching the case to a device or clothing.

According to another aspect of the present invention there is provided a case and eyewear system comprising: (a) eyewear being capable of elastically folding along a lens bridge portion; (b) a storage compartment configured for storing the eyewear in a folded configuration; and (c) a release mechanism for releasing the eyewear from the storage compartment wherein the releasing results in self-unfolding of the eyewear.

According to still further features in the described preferred embodiments the eyewear can be stowed in a folded configuration of less than 4.1 mm thickness for 2.5 diopter lens or less than 3 mm for a 1 diopter range for full size lenses 40 mm wide (thickness includes anti scratch front & back rim).

According to another aspect of the present invention there is provided an eyewear comprising lenses interconnected via a lens bridge and a nose clamp connected to the lens or lens bridge, the nose clamp including nose pads mountable onto a nose of a user, wherein a distance between the nose pads can elastically accommodate noses of varying widths without substantially affecting an orientation of the lenses with respect to the face.

According to still further features in the described preferred embodiments a variation in the nose width between the nose pads of up to 8 mm results in less than 5 degrees of tilt in the lenses with respect to the face and nearly constant controlled pressure on the skin.

According to still further features in the described preferred embodiments the eyewear has a Pince-Nez configuration.

According to still further features in the described preferred embodiments the nose clamp and pads are configured for applying a pinch force of less than 50 grams to the nose of the user.

According to still further features in the described preferred embodiments a reading glasses version of the eyewear can be stowed in a folded configuration of less than 4.1 mm thickness for 2.5 diopter lens or less than 3 mm for a 1 diopter range.

According to still further features in the described preferred embodiments an orientation of each of the nose pads can be adjusted with respect to the nose clamp.

According to still further features in the described preferred embodiments the lens bridge is a Nitinol wire.

According to still further features in the described preferred embodiments a thickest portion of the eyewear is less than 2 mm.

According to another aspect of the present invention there is provided a method of fabricating eyewear comprising: (a) injection molding a pair of lenses each having a thickness of no more than 3 mm; and (b) attaching the pair of lenses to a super elastic lens bridge element.

According to still further features in the described preferred embodiments (b) is effected by overmolding the pair of lenses onto the lens bridge element.

According to still further features in the described preferred embodiments the pair of lenses are injection molded from polycarbonate.

The present invention successfully addresses the shortcomings of the presently known configurations by providing an eyewear that is comfortable to wear, provides accurate alignment between lens centers and the eyes of the user when worn and can be compacted to a small storage volume.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of eyewear which can be stored in a protective small and thin case while being adjustable and comfortable to wear.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The need for compact yet comfortable eyewear has spurred on the development of numerous aesthetic and functional designs including a variety of Pince-Nez configurations.

Prior art Pince-Nez eyewear (see wwwdotendotwikipediadotorg/wiki/Pince-nez) typically utilize nose pads that are directly or indirectly attached to the lenses or lens frame. As a result, any changes to the distance between nose pads affect the distance between the lenses and their angular orientation and position with respect to the eyes which can induce optical prism, introduce error in the optical cylinder axis or affect the lens aesthetics. The varying distance further changes the nose clamp spring force resulting in an inconsistent pinch force for different users and an unstable fit for some and discomfort for others due to large pinch force.

The present design utilizes several configurations for addressing this problem. As is further described hereinbelow, one configuration utilizes nose pads which are attached via a nose pad carrier to the lens bridge and as such are structurally separated from the lenses. In such a configuration the elastic opening force of the nose pad carrier is smaller than the lens bridge force and as such, the nose pads are capable of accommodating different width noses while the eyewear lenses are maintained apart at a correct and aesthetic distance.

The second and presently preferred configuration that addresses the nose pad problem includes user replaceable, variable thickness nose pads that are attached to the lenses and allow the user to easily adjust the glasses for the shape and width of their nose.

In addition to the above and as further described hereinunder, the present eyewear utilizes thin super elastic alloy wire preferably made from Nitinol to interconnect the lenses (referred to herein as a lens bridge) and allow repeated transformation from worn position to nearly complete folding over for storage while exerting repeatable, controlled and nearly constant low pinch force for varying bridge deformation cause by varying width noses during wear. This feature combined with use of thin molded polycarbonate lenses results in Pince-Nez reading eyewear which weigh less than 4.3 grams for 2.5 diopter full sized reading glasses with lens optical area of over 9 $cm^2$. This provides the user with a large viewing zone for reading comfortably without lens distortion without the usability compromises often inflicted by compact reading glasses.

It will be appreciated that in a Pince-Nez design, the weight of the eyewear is important for both stability on the nose and comfort. Typical reading glasses weigh over 20 g, even foldable compact versions (e.g. MicroVision) with smaller lenses weigh over 14 g. Heavier eyewear without ear pieces requires more clamping force to maintain stability on the nose because of the increased weight and the increased mechanical moment which causes instability when the user moves their head up and down or from side to side. Since the clamping force translates to pressure exerted by the nose pads on the tissue, a larger clamping force can lead to user discomfort, pain and in extreme cases, tissue ischemia. The present design is intended to keep the pressure on the nose below 100 mmHg, preferably in the 30-60 mmHg (e.g. 30, 35, 40, 45 50, 55 or 60 mmHg) to avoid local ischemia and associated pain and discomfort.

Figure 1:
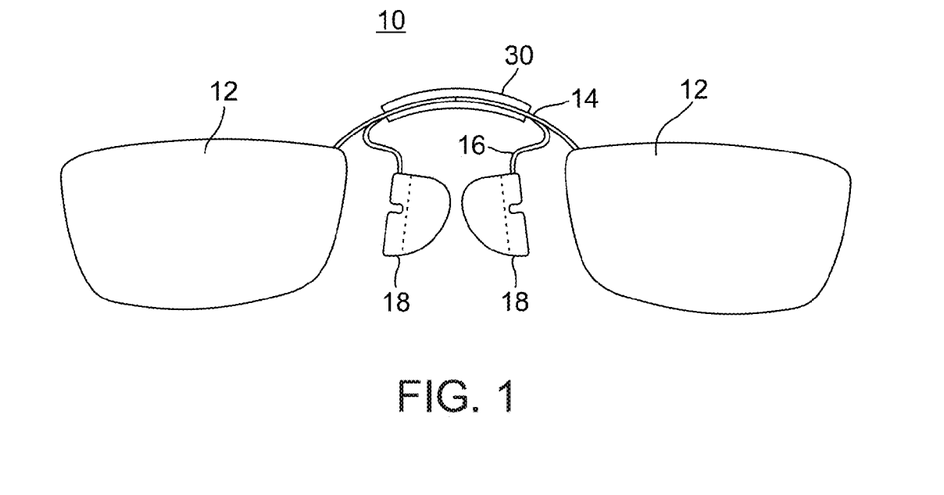
FIG. 1 is a front view of a Pince-Nez embodiment of the present eyewear.

Referring now to the drawings, FIG. 1 illustrates a front view of a Pince-Nez embodiment of the eyewear of the present invention which is referred to herein as eyewear 10. It will be appreciated that the functional features of the present Pince-Nez design can also be incorporated into eyewear having ear pieces and that any of the designs described herein can be used for correcting near or far sightedness, as bifocals, as sunglasses, as computer screen glasses, as 3D glasses or as magnifying glasses.

Lenses 12 are made of polycarbonate that and are injection or compression molded over lens bridge 14 (which interconnects two lenses 12). Lenses 12 can also be made of any optically clear polymer such as acrylics or silicones. Lenses 12 can be tinted to serve as sunglasses and for UV protection, coated with anti scratch and anti-reflective coatings. Lenses 12 can be further shaped to have optical power and serve as reading glasses, vision glasses or configured with a custom optical power to fill a particular prescription. Lenses 12 can be further made of a resin such as OP85 light cured resin in glass molds sold by OptiCast USA. Lenses 12 can be made in spherical power and laminated on their flat back using an appropriate UV cured adhesive with a round cylindrical ultra thin lens that is oriented appropriately and the combined structure cut to the shape of the lens frame and glued or mechanically secured to said lens frame in order to achieve a custom refractive power. Lenses 12 can also be made or coated with polarized material or colored material to facilitate viewing of 3D display systems that rely on color or polarization to display different images to each eye. Lenses 12 are preferably very thin (average thickness of 1 mm or less) since they do not need to fit into a frame or support the mechanical stress induced by frameless nose piece and ear pieces. For example, a full size 2.5 diopter polycarbonate reading lens of 40 mm width and 27 mm height and an edge thickness of 0.2 mm will only have a central thickness of 0.85 mm and average thickness of less than 1 mm. This allows substantial reduction in the mass of both lenses 12 (less than 4 gram), substantially less than any other reading glasses or Pince-Nez with similar sized optics and optical power. This low mass minimizes the force required to clamp eyewear 10 to the nose. While kept thin, the lenses are designed to pass the mandated FDA shatter proof impact test.

Lenses 12 can include a raised rim (around the lens circumference). Such a rim can be slightly thicker than the thickness of lens 12 (0.2-0.4 mm thicker) in order to provide scratch protection for the lens material when placed on a flat object, or folded, or placed into a case (such as that described in FIGS. 5a-b). The design further offers a surface which can reflect light or be tinted, injection molded in different color or texture or painted to further improve the aesthetics of the lenses.

Lenses 12 can be polarized in a manner that will allow portable devices with suitable polarizer such as a screen protector, to mitigate ambient light reflection and allow clearer view of the screen.

Lens bridge 14 is made of thin flexible material such as nitinol wire heat formed into the appropriate shape (NDC, Freemont Calif.).

It may be further processed by grinding or crimping to allow it to easily bend nearly 180 degrees so that the lenses can be folded over each other to be placed into carrying case 20 illustrated in FIGS. 4a-c while still remaining very thin yet robust to possible damage if pressure is applied to case 20. Case 20 can further include a thin sheet to separate lenses 12 in their folded state.

Such super-elastic folding serves three purposes, it provides nearly uniform force over varying nose widths; it alleviates the need for unsightly hinges which can easily be damaged and not conform to case 20 or body geometry when carried and cause the user discomfort; and in addition, the spring force generated in bending lens bridge 14 can be used as a stowage and release mechanism in a case such as that further described hereinbelow.

Lens bridge 14 is attached to each lens 12 by over molding it into the lens or by gluing it to the lens 12. Lens bridge 14 can be fabricated in any profile; preferred are round, or non-round (e.g. square, rectangular) profiles. Non-round profiles are preferred in configurations wherein movement of the lenses along the lens bridge is desired.

Figure 2:
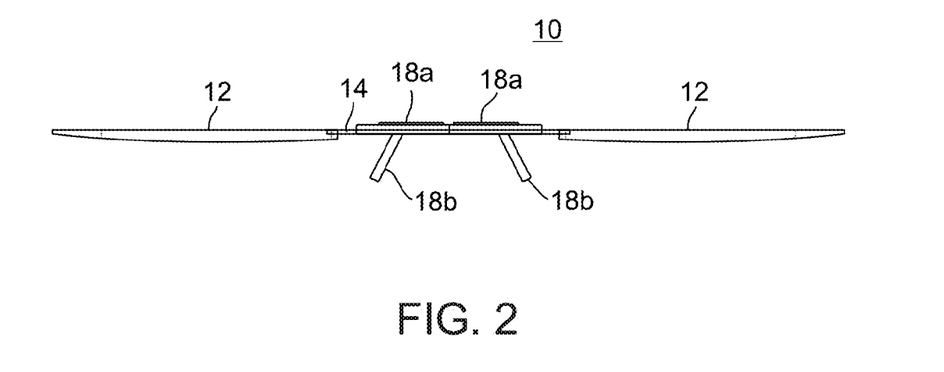
FIG. 2 is a top view of a Pince-Nez embodiment of the present eyewear showing the nose pads in flat and folded configurations.

FIG. 2 illustrates a top view of eyewear 10. Nose pads 18 assume a first position (18a) but when applied to the nose bend along a preferred axis into a second position (18b) and help grip the nose and distribute pressure to stabilize eyewear 10. This can be done by molding a thinner section in pads 18 or by allowing the pad to rotate on the nitinol wire forming a miniature hinge or by other suitable arrangement such that the pads are full flat when placed into the storage compartment and are made of soft material that will not cause discomfort when it comes in contact with the body yet be able to gently grip the skin of the nose to secure the device to the user. Pads 18 can further contain features to indicate to the user which side is front and which is back and should be applied to the face.

Figure 8A:
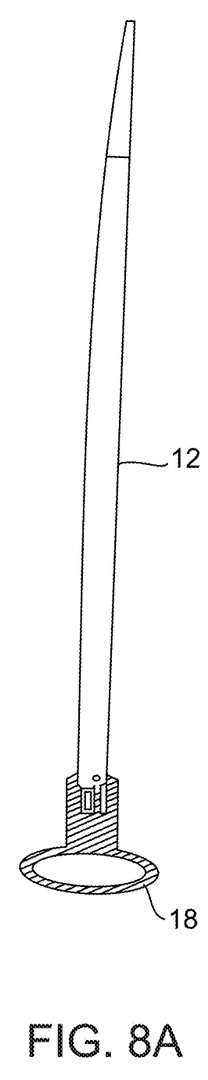
FIGS. 8A-B are top views of a deformable nose pad configuration.
Figure 8B:
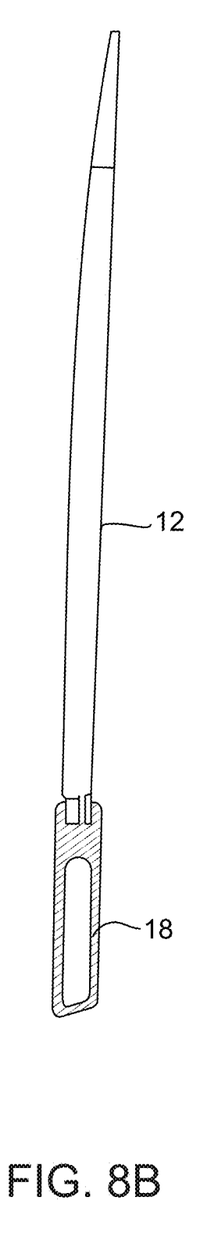

Another configuration of nose pads 18 is illustrated in FIGS. 8a-b. Nose pads 18 can attach to lens 12 or nose clamp and are made of a shell of a material such silicone filled with a gel, fluid or gas. In such a configuration, nose pads 18 deform (FIG. 8a) to distribute the force on the nose and provide grip and comfort. The shell has sufficient elasticity to return to the shape of FIG. 8b when removed from the nose.

Figure 6:
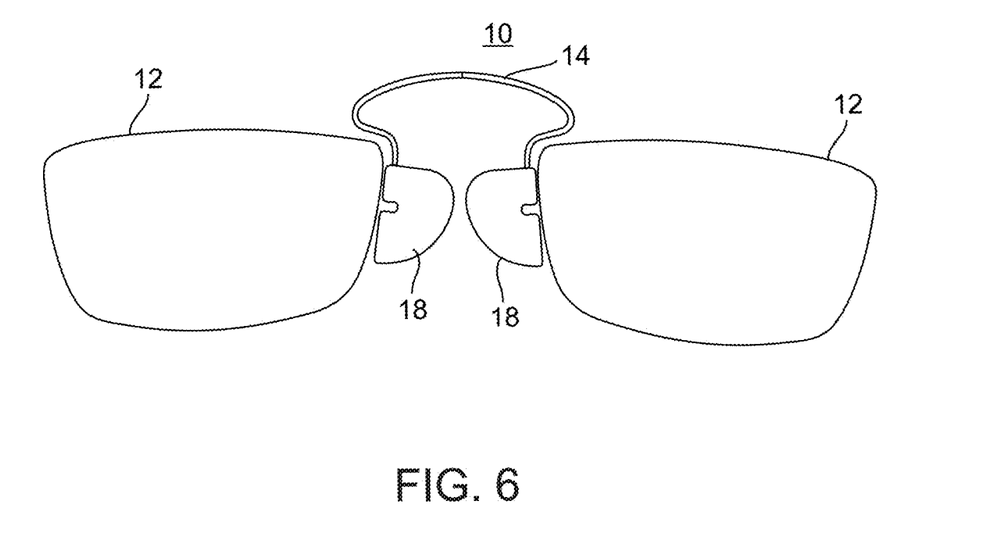
FIG. 6 is a front view of a Pince-Nez embodiment of the present eyewear showing a configuration with the nose clamp and lens bridge combined.

Nose clamp 16 is attached to lens bridge 14 by, for example, welding the two nitinol structures, using a connecting tube/sleeve 30 (shown in FIGS. 1 and 7) which allows nose clamp 18 and lens bridge 14 to pivot with respect to one another and still maintain a planar orientation for storage. Alternative approaches for attaching nose clamp 16 to lens bridge 14 include use of fasteners, gluing, wire wrapping and the like. This arrangement allows nose clamp 16 to assume appropriate width to accommodate different nose widths while keeping lenses 12 in the appropriate orientation and distance from each other. A different embodiment described in FIG. 6 combines noses clamp 16 and lenses 12 and will result in a lens orientation which depends on the nose width but would still provide for a flat, thin, foldable device and would be acceptable for certain types of lenses.

Figure 3A:
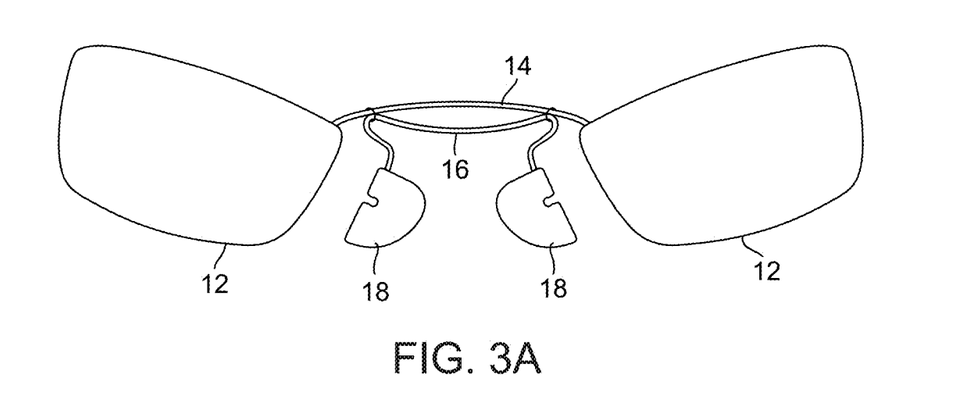
FIGS. 3A-B are front views of the nose clamp of a Pince-Nez embodiment with a open (FIG. 3A) and closed (FIG. 3B) nose clamp configuration.
Figure 3B:
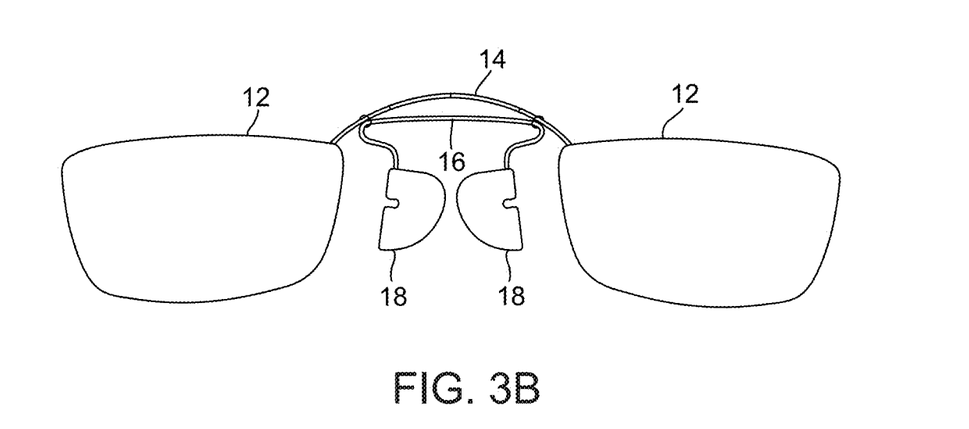

FIGS. 3a-b illustrate a bi-stable nose clamp 16 which allows the user to open the nose clamp by rotating the lenses upward (FIG. 3a) and forcing the top part of nose clamp 16 down, thus opening nose clamp 16 and allowing a user to easily place the open nose clamp 16 on the nose. Lenses 12 can slightly rotate downward which forces the central portion of nose clamp 16 up and restoring nose clamp 16 to its original position and allow it to apply pressure to the nose.

Figure 7:
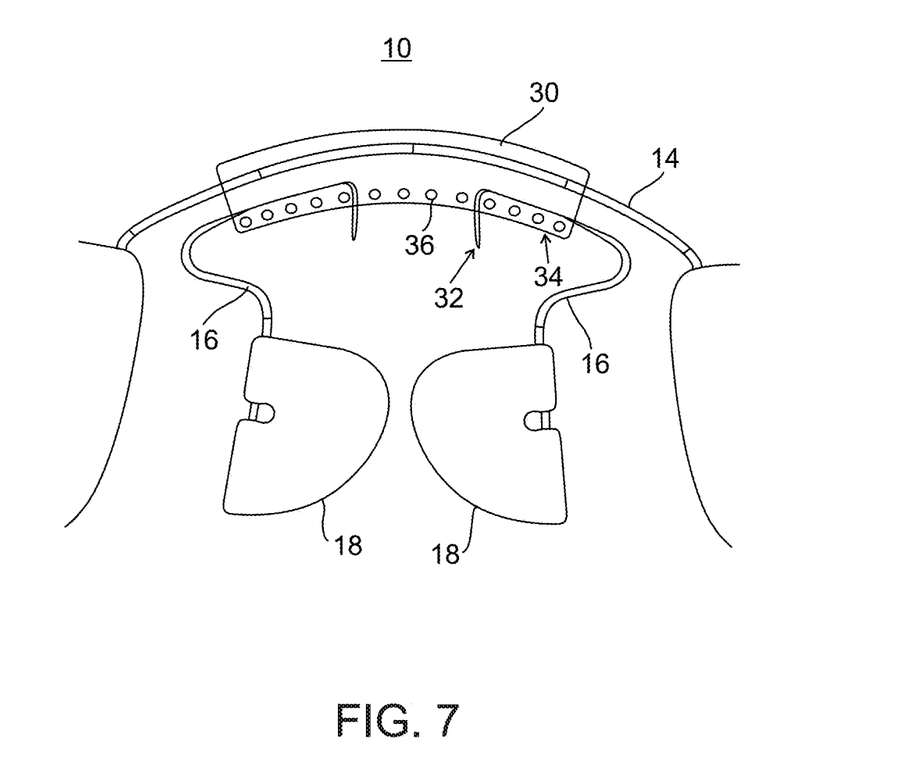
FIG. 7 illustrates a lens bridge overmolded with a sleeve which enables each side of the nose clamp to be individually adjusted to achieve the optimal width and pressure on the nose.

FIG. 7 illustrates a plastic injection molded sleeve 30 mounted over lens bridge 14 and a track 34 which includes detents 36 molded into sleeve 30. Track 34 enables sliding of wire 32 into detents at various positions thus enabling each side of nose clamp 16 to be individually adjusted to achieve the optimal width and pressure on the nose.

Figure 4A:
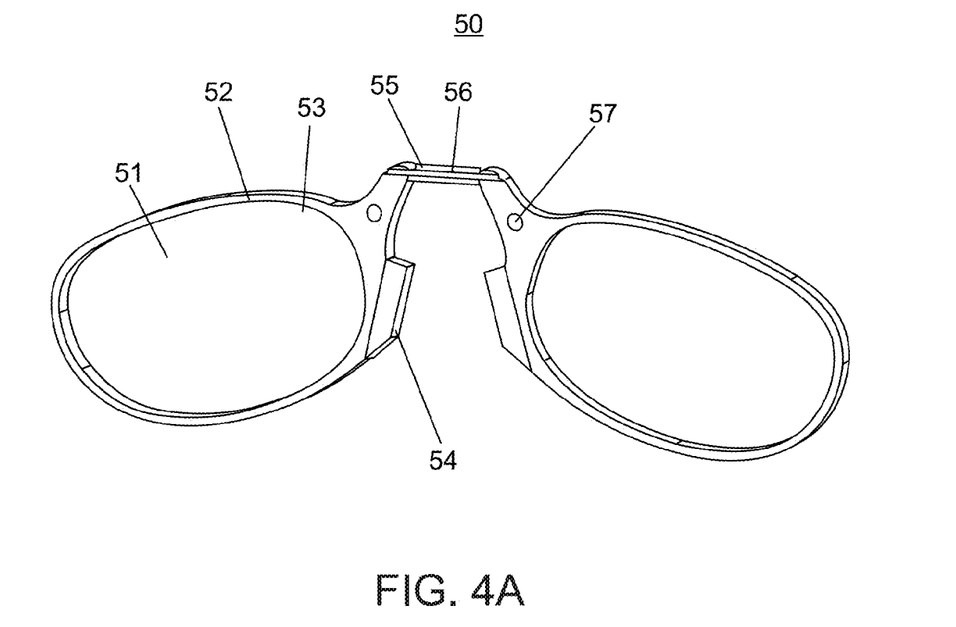
FIG. 4A illustrates another embodiment of the Pince Nez eyewear of the present invention.

One presently preferred configuration of the present invention is illustrated in FIG. 4a which illustrates a reading glasses Pince Nez configuration which is referred to herein as eyewear 50.

Eyewear 50 includes thin plastic lens 51 having a convex front surface 53 and a plano back side and a rim 52 to protect the optical surfaces from abrasion. Nose pads 54 are glued to lenses 51 which are interconnected by a super elastic bridge 56, covered by an elastic member 55. Lens bridge 56 preferably has a unsupported length of 10 mm and diameter of 0.020 inch and crimped ends to mechanically embed in the polycarbonate lens over molded thereon. Lens bridge 56 can include a silicone tube or other elastomer placed or over molded on it to complete the aesthetic bridge and provide the user with a place to handle the glasses. Magnetizable elements 57 made of nickel plated metal can be imbedded in frame 57.

Figure 4B:
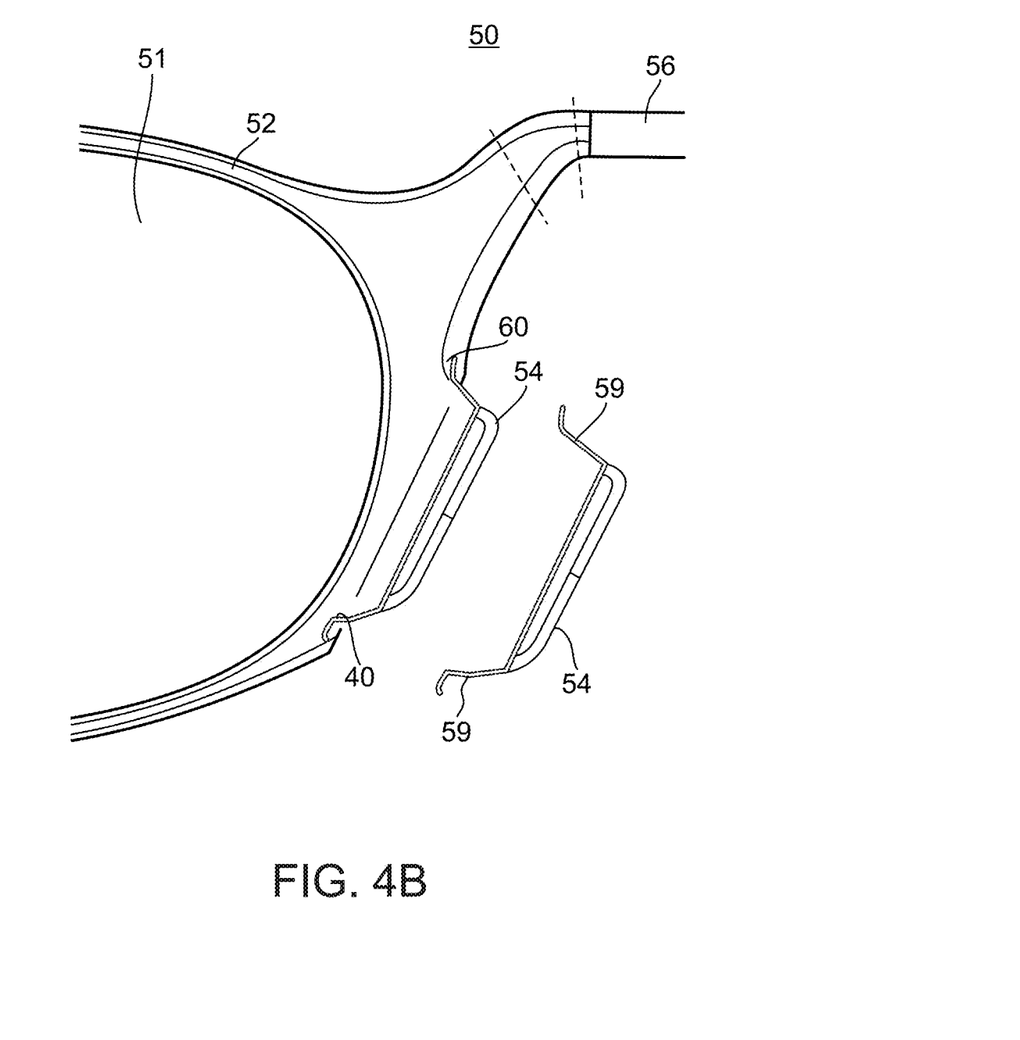
FIG. 4B illustrates one embodiment of a replaceable nose pad.

FIG. 4b illustrates one mechanism for enabling a user to fit eyewear 50 with use-specific nose pads 54 via thin metal (e.g. Nitinol) or plastic clip 59—the ends of which clip into features 60 molded into lens 51. To insert nose pad 54, the ends of clip 59 are slightly forced inward (by applying pressure to the ends of nose pad 54) and slipped into features 60, the ends spring back to their original position and are trapped within features 60. Nose pads 54 having different clip 59 configurations can be used to accommodate noses of varying widths and shapes. The nose pads can be also fabricated from injection molded or cast elastomer having a textured low durometer front surface to maintain friction with the skin; a second layer having molded features such as voids to allow for compliance; an optional third layer having low durometer to accommodate different nose angles widths. The molded nose pad 54 can be fabricated by over molding or by a single molding process. It can have an adhesive layer to attach directly to the lens or to the clip 59. It can be over molded on clip 59.

Figure 4C:
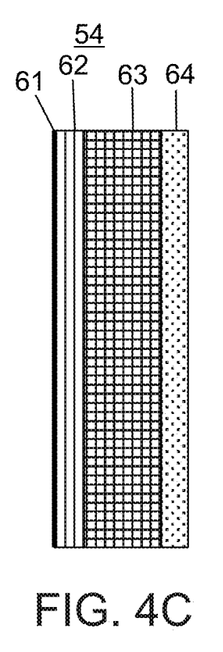
FIGS. 4C-D are cross sectional views of two alternative configurations of a nose pad shown in FIGS. 4A-B.
Figure 4D:
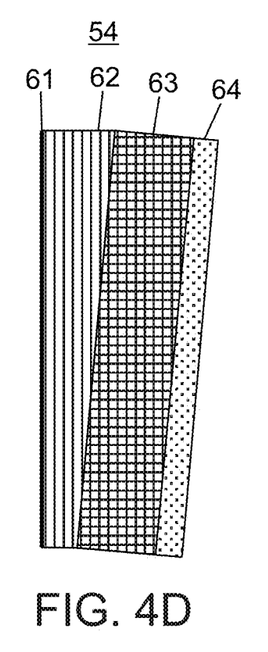

FIGS. 4c-d are cross sectional views of nose pad 54 of eyewear 50. Nose pad 54 is constructed from several bonded layers including an adhesive layer 61 (such as 3M 9495), a rigid spacer 62, a compliant layer 63 and a skin contact layer 64. FIG. 4d illustrates a nose pad 54 which is designed for a narrower nose. In such a configuration, adhesive layer 55 is bonded to a thicker and wedge shaped rigid spacer 62 to insure a good fit by the user.

Compliant layer 63 can include an elastomer (e.g. closed cell polyurethane such as Rogers Corporation Poron 4701-40-3045-04) to allow conformation to user skin and spread nose clamping forces thus reducing the pressure on the skin and increasing user comfort. Skin contact layer 64 can be fabricated from a material which increases the friction with the skin even in the presence of oily sebum, makeup or sweat such as, soft durometer silicone with serrated features, aluminum oxide grit (such as Kramer Industries 150 White Aluminum Oxide) or 3M grip tape (3M GM614) bonded into the surface.

As is mentioned hereinabove, eyewear that are used episodically for specific tasks such as sunglasses and reading glasses are typically stowed until use and thus are oftentimes lost or misplaced.

To traverse this problem, the present eyewear can include elements which enable attachment thereof to clothing, to accessories (e.g. bracelet, a pendant, or a chain). A small metallic insert can be added to the lenses to allow them to snap to a small magnet attached to clothing or an object such as a screen monitor via another magnet forming a clasp, or to an object via a contact adhesive or a metal object via magnetic force.

One preferred storage configuration of the present eyewear, includes a storage case which can be attached to a personal electronic device (e.g. cellular telephone) and eyewear which is configured for storage within the case.

Such a storage case can store the eyewear of the present invention in a folded or unfolded configuration. The description below describes a storage case which stores the eyewear in a folded configuration utilizes the lens bridge as a spring for storage and release of the eyewear. Other configuration which store the eyewear in a partially folded or unfolded configuration are also envisaged herein.

Thus according to another aspect of the present invention there is provided an eyewear system which is referred to herein as system 100.

Figure 5A:
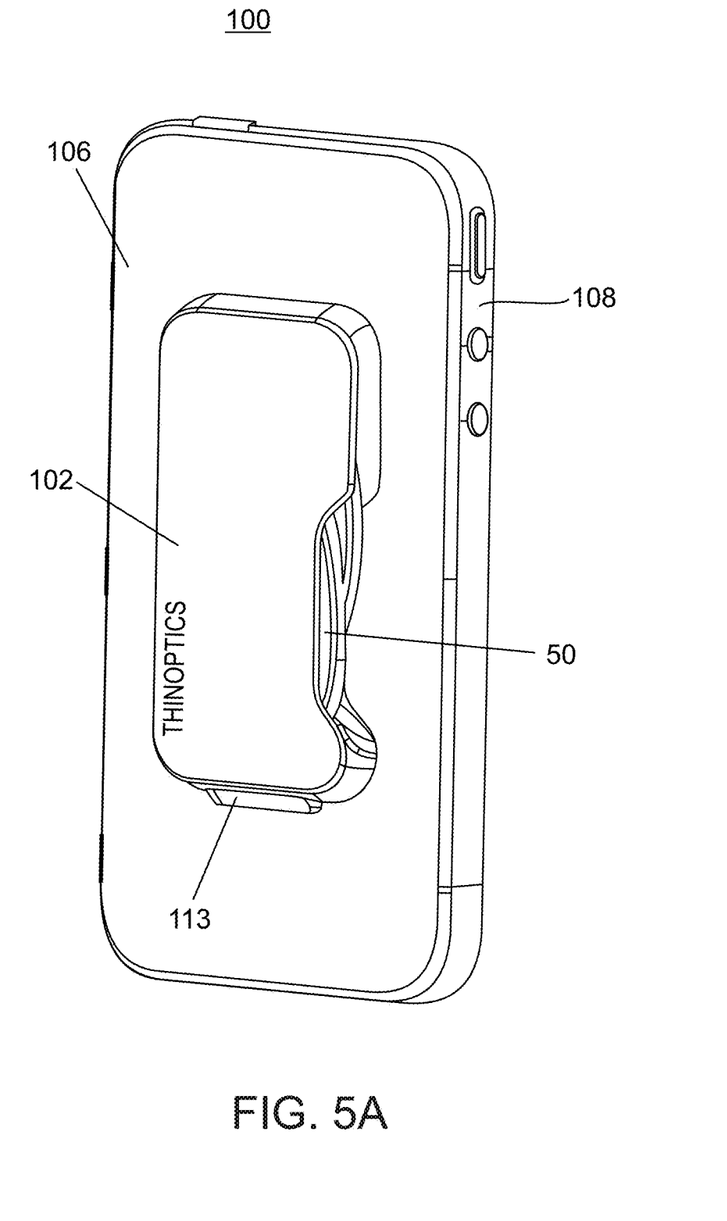
FIG. 5A illustrates an eyewear system which includes a smartphone-mounted carrying case which includes the Pince Nez eyewear of FIG. 4A folded and stowed within the case.
Figure 5B:
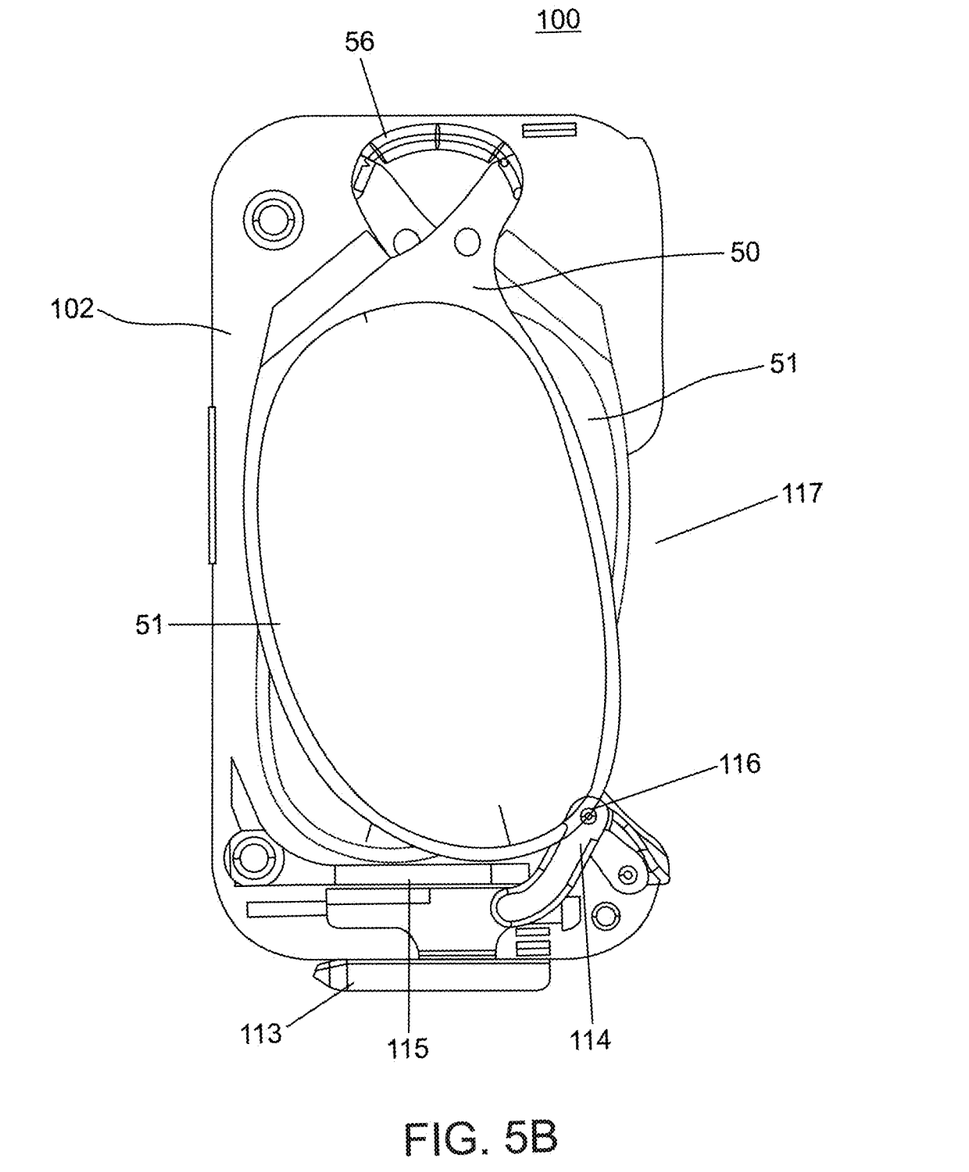
FIG. 5B illustrates the eyewear release mechanism of the storage case shown in FIG. 5A.

As shown in FIGS. 5a-b, system 100 includes a pair of eyewear (preferably Pince Nez) and a carrying/storage case 102. Carrying/storage case 102 is configured for storing the eyewear which can be any of the eyewear configurations described herein (eyewear 50 shown).

Case 102 can be a standalone carrying case or it can be incorporated into an article of clothing, an accessory, a bag or a personal device such as a smartphone. FIG. 5a illustrates an embodiment of case 102 which is incorporated into, or attached to (e.g. via contact adhesive), a cover or back panel 106 of a smartphone 108.

FIG. 5b illustrates case 102 (mounted on smartphone 108) and stored eyewear 50 and the mechanism which enables storage and release of eyewear 50 from case 102. Eyewear 50 is stored in case 102 by folding lenses 51 around superelastic bridge 56 such that lenses 51 are positioned one on top of the other in a reverse orientation. Such folding can be effected prior to insertion of eyewear 50 into case 102, or by inserting one lens 52 into case 102 and folding the other lens 51 into case 102. Once in the case, retention/release mechanism 114 traps eyewear 50 within the case under the spring tension generated by superelastic bridge 56. To release eyewear 50 from case 102, the user simply slides trigger 113 sideways to overcome spring 115 and pull downward retention/release mechanism 114 which locks the top mounted lens 51 in case 102 via interference point 116. Once interference point 116 is moved downward, superelastic bridge 56 forces top mounted lens 51 through case opening 117 and the user can then easily pull eyewear 50 out of the case.

Case 102 shown in FIGS. 5a-b can include an adhesive back (3M 300LSE) for gluing it to a surface. The inside surfaces of case 102 can be further made from a material that will wipe the lenses when inserted or removed from case 102.

Case 102 is configured for storing a Pince-Nez configuration of full lens size and 2.5 diopters in a volume of less than 10 cm$^3$, preferably less than 6 cm$^3$ in its folded form for a full 40 mm wide 2.5 diopter readers (narrower lenses or lower power will result in correspondingly even smaller storage volume).

Table 1 below lists the thickness, storage volume and weight of the present eyewear when configured with 1.00, 1.50, 2.00, 2.50 and 3.00 optical power and a full (40×26 mm) or partial (35×24, 29×26 or 36×27 mm) lens optical zone.

TABLE 1

| Present Eyewear - Pince Nez configuration | Optical power in diopters | | | | |
|---|---|---|---|---|---|
| | 1.00 | 1.50 | 2.00 | 2.50 | 3.00 |
| Full size optical zone 40 × 26 | | | | | |
| Maximum thickness mm | 0.9 | 1.1 | 1.2 | 1.4 | 1.6 |
| Thickness folded mm | 1.8 | 2.2 | 2.5 | 2.8 | 3.2 |
| Folded case volume cm$^3$ | 3.6 | 4.1 | 4.6 | 5.1 | 5.6 |
| Approximate weight glasses g | 2.6 | 3.0 | 3.4 | 3.7 | 4.1 |
| Optical zone 35 × 24 (comparable to Wallet Readers) | | | | | |
| Maximum thickness mm | 0.8 | 0.9 | 1.0 | 1.0 | 1.1 |
| Thickness folded mm | 1.6 | 1.7 | 1.9 | 2.1 | 2.3 |
| Folded case volume cm$^3$ | 2.7 | 2.9 | 3.1 | 3.4 | 3.6 |
| Approximate weight glasses g | 2.1 | 2.2 | 2.4 | 2.5 | 2.7 |
| Optical zone 29 × 26 (comparable to I4U) | | | | | |
| Maximum thickness mm | 0.7 | 0.7 | 0.7 | 0.8 | 0.8 |
| Thickness folded mm | 1.3 | 1.4 | 1.4 | 1.5 | 1.6 |
| Folded case volume cm$^3$ | 2.3 | 2.4 | 2.4 | 2.5 | 2.6 |
| Approximate weight glasses g | 1.8 | 1.8 | 1.9 | 1.9 | 2.0 |
| Optical zone 36 × 27 (comparable to Antique Pince Nez) | | | | | |
| Maximum thickness mm | 0.8 | 0.9 | 1.0 | 1.1 | 1.2 |
| Thickness folded mm | 1.6 | 1.8 | 2.0 | 2.2 | 2.4 |
| Folded case volume cm$^3$ | 3.1 | 3.4 | 3.7 | 4.0 | 4.4 |
| Approximate weight glasses g | 2.3 | 2.5 | 2.7 | 2.9 | 3.1 |

The present invention can be manufactured by heat forming 0.02 inch diameter nitinol wire to the lens bridge shape so that it maintains is super elastic capacity and then over molding or bonding (Dymax 3013) it to polycarbonate injection molded lenses.

Thus, the present invention provides a novel eyewear configuration which in the Pince Nez configuration applies a repeatable and controllable low pinch force with force constant of about 3 g/mm to achieve both comfort and stability. Commercially available Pince Nez readers such as the Wallet Reader™ and i4U™ have a force constant of about 35 g/mm and 14 g/mm (respectively) which result in a much higher pressure on a typical user's nose and significant discomfort and even pain.

When worn on the more compliant nostrils, these prior art readers compress the nostrils and make breathing difficult.

As used herein the term "about" refers to ±10%.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

A study was undertaken in order to identify features that contribute to the usability and comfort of a Pince Nez reader configuration. Several dozen prototypes were tested on individuals and each individual provided feedback with respect to the following parameters: ease of placing on the nose, torsion of lens bridge for wide noses, stability while head is tilted forward (reading or looking at the ground), stability from moving up during facial expression such as smiling that deform the skin, stability while rotating head from side to side, comfort upon installation on nose, comfort for long term use, all of the above on skin with oil, makeup or sweat, all of the above for varying shape and width of noses, ease of installation into case or removing from the case by holding glasses with one hand and case in the other, ability to manipulate the glasses into case and onto the face without touching the optical area, and aesthetic acceptance to the user.

The data was collected and processed in order to derive guidelines for constructing a Pince Nez configuration which addresses the limitations of prior art designs while providing an aesthetically pleasing design. Table 2 below summarizes the present findings.

TABLE 2

| Desired feature/Design feature | Super elastic bridge | Thin lenses | Nose pads |
|---|---|---|---|
| Low pressure on skin for comfort | constant pinch force as nose width varies | Low mass for full sized optics requires smaller pinch pressure on nose | Conforming nose pads to spread the force and thus reduce the pressure. Replaceable nose pads with varying angle and width allow user to control the force exerted by bridge for varying nose anatomical shapes |
| Conventional looking bridge for aesthetics | thin (0.020" dia) super elastic spring that can be embedded in another structure such as silicone tubing for conventional bridge appearance | | |
| Lenses fit straight on face for aesthetics and correct cylinder optical power | | | Replaceable nose pads with varying angle and width |

TABLE 2-continued

| Desired feature/Design feature | Super elastic bridge | Thin lenses | Nose pads |
|---|---|---|---|
| Stability | Resists torsion of lenses when placed on wider noses | Low mechanical moment due to most of the mass close to nose reduces forces during head rotation | Skin contact layer enhances friction with nose to avoid tilting forward or slippage with low pinch force |
| Ultra compact storage | Allow complete and repeated folding for storage volume <10 cm$^3$ for a full 40 mm wide 2.5 diopter readers (narrower lenses or lower power will result in correspondingly even smaller storage volume) | Less than 4 mm thick folded configuration or 2 mm in flat configuration | Same thickness as lens in stored position |
| Easy and quick single hand deployment in and out of storage | Bridge covered with silicone tube for gripping glasses without leaving fingerprints on optics. Trigger actuated spring loaded out of case reduces need to manipulate glasses when removing from case. | Raised rim around lenses for handling lenses to put on nose. Low weight enables tiny magnet to securely attach glasses to storage object. | |

Figure 9A:
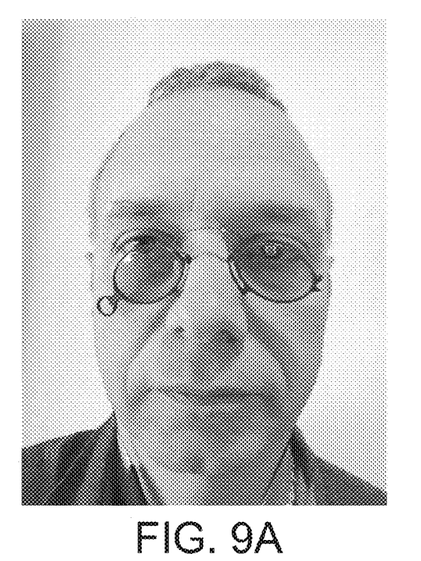
FIGS. 9A-D illustrate nose mounting of three prior art Pince Nez eyewear (FIGS. 9A-C) and the present Pince Nez eyewear (FIG. 9D).
Figure 9B:
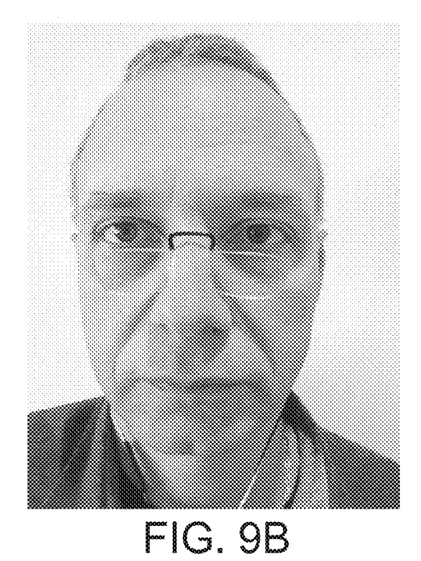
Figure 9C:
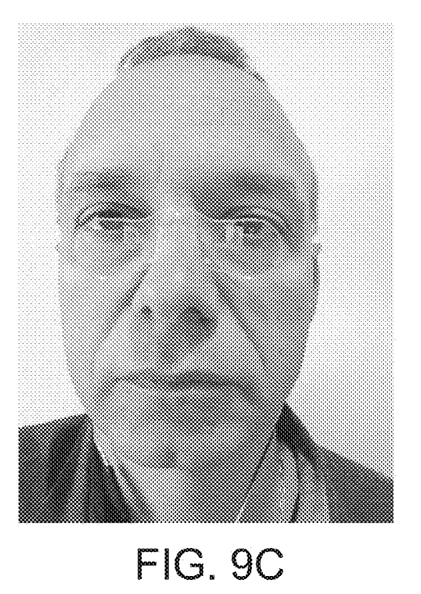

The limitations of prior art designs are shown in FIGS. 9a-c which illustrate three prior art Pince Nez eyeglasses. FIG. 9a is an image of an antique Pince Nez mounted on a nose of a user. Note the drooping of the lenses which is aesthetically displeasing. In addition, these eyeglasses are hard to maintain on the nose due to low pinching and frictions forces produced by the nose pads. FIG. 9b illustrates a pair of Wallet reader eyeglasses. Note the strong pinching force on the nose of the user (deforming the nose) which can cause discomfort and pain, as well as actual tissue damage over time. FIG. 9c illustrates the I4U readers which are characterized by small lenses which are difficult to correctly align with the users eyes and large pinching forces on the nose which can cause discomfort, pain and tissue damage.

Figure 9D:
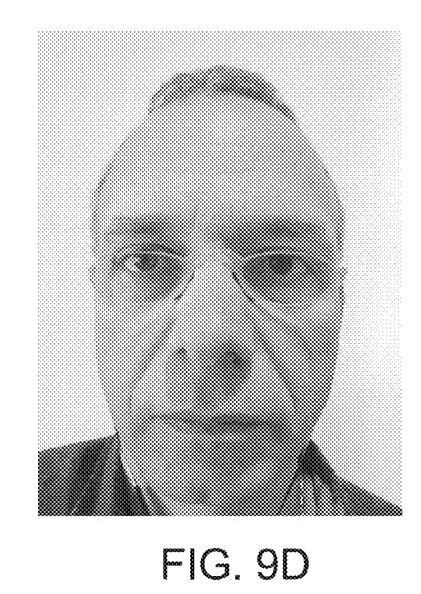

FIG. 9d illustrates the present design which was constructed while taking into consideration the findings of table 1. As is illustrated by this image, the present Pince Nez eyewear sits firmly on the nose, provides excellent alignment between the lens centers and eyes without lens drooping and without applying large pinch forces on the nose (note no nose tissue deformation). The configuration shown in FIG. 9d was at least as stable on the nose as those shown in FIGS. 9b-c and yet it produced far less pinching force on nose tissue and thus was noticeably more comfortable to wear especially over extended time periods.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. An eyewear system comprising lenses interconnected via a lens bridge and a pair of nose pads attachable to said eyewear, said pair of nose pads having a skin contact layer for enhancing friction with a nose of a wearer, the eyewear being adapted to bend at the bendable bridge to provide a pinch force of less than 50 grams from the nosepads to a nose of a user over a variation in distance between the nosepads of up to 8 mm.

2. The eyewear system of claim 1, wherein said nose pads include a compliant and texturized skin contact layer.

3. The eyewear system of claim 1, wherein said lens bridge is fabricated from Nitinol.

4. The eyewear system of claim 1, further comprising a case having a storage compartment including a retention/release mechanism for trapping the eyewear within said storage compartment under a spring tension generated by said lens bridge.

5. The eyewear system of claim 1 wherein the eyewear has a weight of 4.3 grams or less.

6. The eyewear system of claim 5 wherein each lens comprise an optical zone of over 9 cm$^2$.

7. The eyewear system of claim 1 wherein the nosepads are adapted to move with respect to the lenses to accommodate different nose geometries.

8. The eyewear system of claim 1 wherein the nosepads and bridge are adapted to pivot with respect to each other.

9. The eyewear system of claim 1 further comprising a nosepad connector adapted to permit a position of each nosepad with respect to the frame to be individually adjusted.

10. Eyeglasses comprising:
a pair of lenses;
a pair of nose pads; and a frame supporting the optical lenses and the nose pads,
the frame comprising a bendable bridge disposed between frame portions supporting the lenses,
the eyeglasses being adapted to bend at the bendable bridge to provide a pinch force of less than 50 grams from the nosepads to a nose of a user over a variation in distance between the nosepads of up to 8 mm.

11. The eyeglasses of claim 10 wherein the eyeglasses have a weight of 4.3 grams or less.

12. The eyeglasses of claim 11 wherein each lens comprise an optical zone of over 9 cm$^2$.

13. The eyeglasses of claim 10 wherein the nosepads are adapted to move with respect to the lenses to accommodate different nose geometries.

14. The eyeglasses of claim 10 wherein the nosepads and bridge are adapted to pivot with respect to each other.

15. The eyeglasses of claim 10 further comprising a nosepad connector comprising a plurality of connection positions between at least one nosepad and the frame.

16. The eyeglasses of claim 15 wherein the nosepad connector is adapted to permit a position of each nosepad with respect to the frame to be individually adjusted.

17. The eyeglasses of claim 10 wherein each nosepad comprises a friction material disposed on a nose contact surface.

18. The eyeglasses of claim 10 wherein the bendable bridge comprises superelastic nitinol.

* * * * *